(12) United States Patent
Teraoka et al.

(10) Patent No.: US 6,264,250 B1
(45) Date of Patent: Jul. 24, 2001

(54) TUBE JOINT

(75) Inventors: Reija Teraoka, Kuta Hiroshima; Kuniomi Kuroda, Sapporo, both of (JP)

(73) Assignee: Solar Giken Co., Ltd., Hokkaido (JP)

( * ) Notice: Subject to any disclaimer, the term of this patent is extended or adjusted under 35 U.S.C. 154(b) by 0 days.

(21) Appl. No.: 09/189,409

(22) Filed: Nov. 10, 1998

(30) Foreign Application Priority Data

Nov. 10, 1997 (JP) .................................. 9-346984

(51) Int. Cl.[7] .................................. F16L 17/00
(52) U.S. Cl. .................. 285/340; 285/348; 285/382.7
(58) Field of Search .................. 285/340, 348, 285/382.7

(56) References Cited

U.S. PATENT DOCUMENTS

| | | | |
|---|---|---|---|
| 2,448,888 | * 9/1948 | Hynes | 285/340 |
| 2,995,388 | * 8/1961 | Morello et al. | 285/348 |
| 2,999,701 | * 9/1961 | Blair et al. | 285/340 |
| 3,434,744 | * 3/1969 | Yoke et al. | 285/340 |
| 3,653,695 | * 4/1972 | Dunton et al. | 285/340 |
| 3,893,716 | * 7/1975 | Moreiras et al. | 285/382.7 X |
| 4,022,499 | * 5/1977 | Holmes et al. | 285/328 |
| 4,037,864 | * 7/1977 | Anderson et al. | 285/342 |
| 4,635,975 | * 1/1987 | Campbell | 285/340 |
| 4,826,218 | * 5/1989 | Zahuranec | 285/342 |
| 5,292,157 | * 3/1994 | Rubichon | 285/340 |
| 5,553,901 | * 9/1996 | Serot | 285/340 |

FOREIGN PATENT DOCUMENTS

| | | | |
|---|---|---|---|
| 1025015 | * 1/1978 | (CA) | 285/382.7 |
| 392171 | * 9/1965 | (CH) | 285/340 |
| 4041679 | * 6/1992 | (DE) | 285/382.7 |
| 489289 | * 4/1992 | (EP) | 285/382.7 |
| 2002079 | * 2/1979 | (GB) | 285/382.7 |

* cited by examiner

Primary Examiner—Teri Pham Luu
(74) Attorney, Agent, or Firm—Reed Smith Hazel & Thomas LLP

(57) ABSTRACT

The present invention relates to plastic tube joints to transport warm water or tap water for air conditioning use, especially so-called simple-action tube joints.

11 Claims, 4 Drawing Sheets

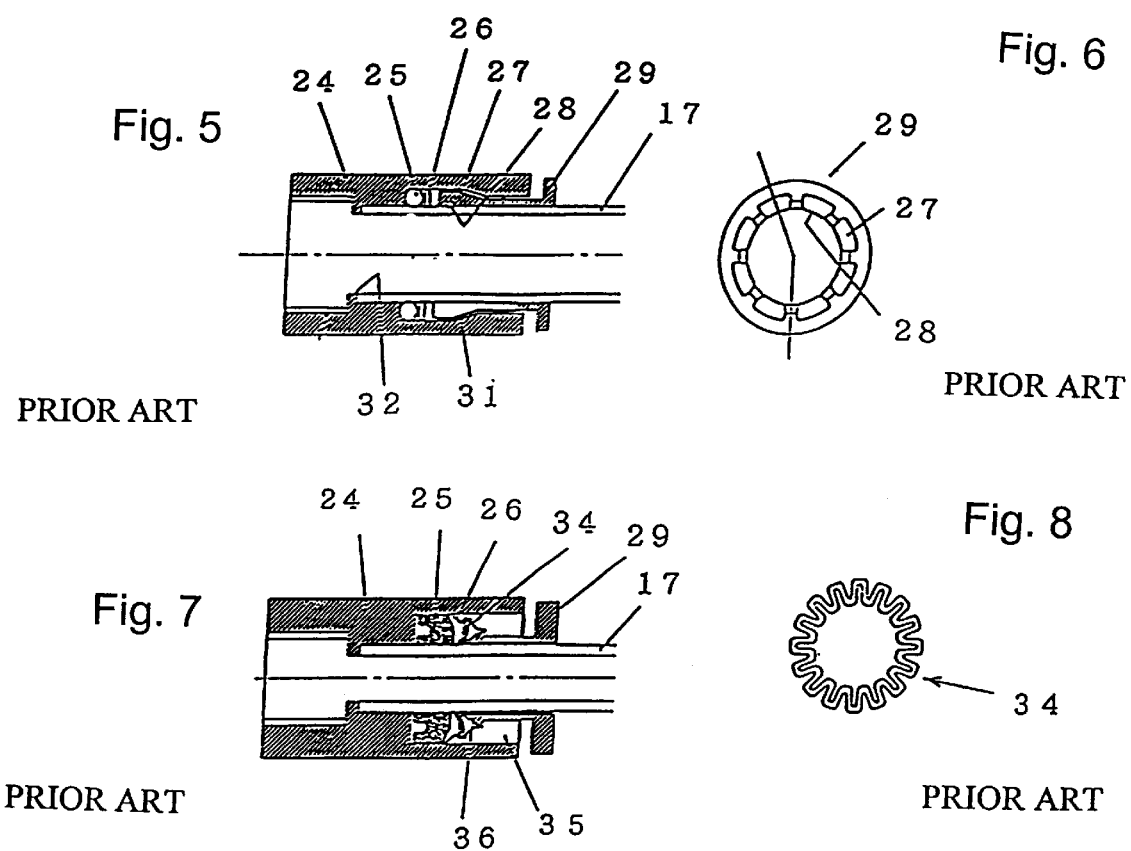

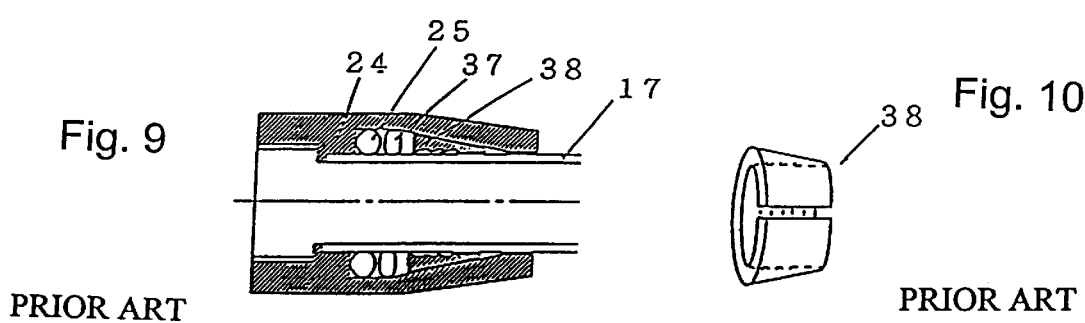
Fig. 9 PRIOR ART
Fig. 10 PRIOR ART
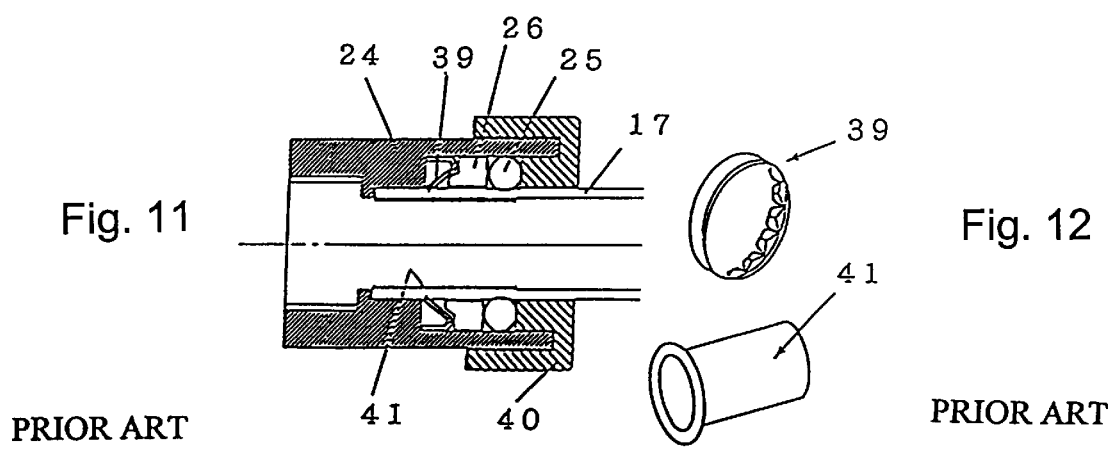
Fig. 11 PRIOR ART
Fig. 12 PRIOR ART

TUBE JOINT

FIELD OF THE INVENTION

The present invention relates to plastic tube joints to transport warm water or tap water for air conditioning use, especially so-called simple-action tube joints,

BACKGROUND OF THE INVENTION

Principal embodiments of conventional tube joints are shown in FIGS. 5 to 12. They would be called simple-action tube joints for plastic tubes, and connection is complete only by inserting an insertion tube (17). In FIG. 5, numeral (24) represents a joint main unit, numeral (25) represents a sealing member e.g. an O-ring, and numeral (26) represents a protection ring.

Numeral (29) represents a flange which is disposed between the joint main unit (24) and the insertion tube (17), and a part of the flange (29) is split into plural arms (27) (eight arms in the figure) except for a portion adjacent to its brim, as shown in FIG. 6.

In the case of this tube joint, the parts are made of metal or plastic. If the material is plastic, metal pieces (28) would be mounted at a tip of the arms as claws. Then in the event of inserting the insertion tube (17), the arms (27) are pressed and expanded, and subsequently the insertion tube (17) passes through the O-ring (25) to be inserted to a projecting portion (32). Thus, connecting operation is completed.

When pull-out force is supplied to the insertion tube (17), a diameter of the expanded arm group will be reduced by a tapered portion (31) of the joint main unit (24), a frictional force is generated between the claws and the insertion tube (17), so that it prevents separation of the insertion tube (17). In order to pull out the inserted tube (17), the flange (29) is pressed against the joint main unit (24). Then, the arm group (27) is released from the tapered portion (31) to enlarge the diameter of the arm group, and the claws loses their resistance force to easily pull out the insertion tube (17).

In FIGS. 7 and 8 showing examples of conventional art, a clamping ring (34) made by punching out a metal plate is used as a clamping ring means to prevent separation of the insertion tube (17). In this system, when the insertion tube (17) is inserted, the clamping fin (34) is pressed and expanded, and separation of the insertion tube (17) is prevented only by the clamping ring (34).

In order to pull out the inserted tube (17), the flange (29) is pressed, and a tapered portion (36) at the tip integrated with the flange (29) enlarges the diameter of the clamping ring (34). Accordingly, it is not necessary to split the tip portion of the flange (29). This type of joint would be used especially for air piping of tubes having a small diameter (most of having an outer diameter of 12 mm or less). Numeral (35) represents a ring to hold the clamping ring (34) and a release ring.

FIGS. 9 and 10 show a conventional art of the simplest structure, and a plastic clamping ring (38) is used. This structure prevents separation of the insertion tube (17) by reducing the diameter of a C-shaped clamping ring (38) having a tapered portion.

In this case, a sealing material (37) has characteristic that it expands by contacting water. This type of joint is often used for flexible polyethylene tubes, but a clamping ring will not work for a rigid tube. Further, an additional tool is required in order to pull out the inserted tube ( 17).

In the case shown in FIGS. 11 and 12, a particular clamping ring (39) made of metal is used, in which a sleeve (41) is inserted into a tip portion of the insertion tube (17). Numeral (40) represents a cap to hold the clamping ring (39) and an O-ring (25). In this system, once the insertion tube (17) is inserted, the clamping ring (39) fixedly biting into the insertion tube (17) can not be detached while the joint main unit (24) and the cap (40) can be disassembled each other, and therefore such part of the insertion tube (17) is to be cut off and disposed. This type of joint is used only in the insertion direction.

However, the joint as shown in FIGS. 5 and 6 requires high manufacturing costs due to its complicated structure. In the case of using a tube having a diameter of the maximum size in the permissible range, an insertion operation would be hard. If such tube is inserted forcibly, then the flange (29) will no be movable and the tube can not be pulled out any more.

The joint shown in FIGS. 7 and 8 is mainly used in an air piping system. The clamping ring (34) has a mechanical upper limitation, i.e. a problem in its resistance force against an action of pulling out the inserted tube (17). The joint shown in FIGS. 9 and 10, as above-mentioned, is not used for rigid plastic tubes. Also, it is troublesome to use additional tools to pull out the inserted tube (17).

To pull out the inserted tube of the joint shown in FIGS. 11 and 12, it is necessary to remove a cap (40). In this case the clamping ring (39) which bites into the insertion tube (17) will be pulled out from the main unit (24) together with the O-ring (25). The clamping ring and the O-ring can not be easily removed from the insertion tube, and the insertion tube (17) has to be finally cut off to be used again.

Accordingly, if it is necessary to reinsert the insertion tube (17), the joint itself will be thrown away because the clamping ring (39) of the joint once inserted can not be reused. Moreover, in the case that insertion of the metal sleeve (41) is hard and impossible, the joint could be joined without using the sleeve (41). However, there is fear of water leakage even though the joint seems to have joined.

If the sleeve (41) can not be inserted, the outer diameter of the insertion tube (17) would be relatively small and an sealing operation of the O-ring (25) will not be complete. According to JIS (Japanese Industrial Standard), for example, an insertion tube made of polybutene having a diameter called "20A" (size) has a large permissible range that the inner diameter is 21.2 mm plus or minus 0.3 mm while the outer diameter of 27 mm plus or minus 0.15 mm. Therefore, it is obvious that problems will occur, namely an insertion tube having a relatively small diameter can not be inserted in a metal sleeve, or an insertion tube having a relatively large diameter would be loose for the sleeve and makes it ineffective.

The diameters of the O-rings and the clamping rings of all the above joints are formed to be smaller than the diameters of the insertion tubes (17) in order to complete the joints only by inserting the insertion tubes (17). Accordingly, the insertion operation is hard base a large-diameter insertion tube will be inserted into small-diameter rings.

In addition to the above-mentioned permissible range in the polybutene tube diameter, if the polybutene tube is provided in a rolled manner, such tube will be deformed as to have an oval cross section, and difference between a larger diameter and a smaller diameter of the tube will exceed 1 mm in the case of a tube of diameter called "13A" (normal outer diameter of 17 mm). A diameter of a joint should be selected to meet to the minimum limit of its permissible range of an outer diameter, and it is difficult to insert an insertion tube having a diameter selected based on the maximum limit of its permissible range. Therefore, it is recommended to apply lubricant onto an inner surface of a joint. However, the lubricant is only effective to an O-ring but not to a clamping ring.

All of such conventional joints are not applicable to absorb the lack of uniformity in the diameter size of plastic insertion tubes. The present invention is subject to solve the above problem and an object of the present invention is to provide a detachable tube joint which can be easily inserted or pulled out regardless the precision and/or deformation of the insertion tube, and which does not need an additional operation of inserting a sleeve into the insertion tube.

SUMMARY OF THE INVENTION

In order to solve the above problems, the tube joint of the invention comprises a first joint unit (1) and a second joint unit (2) screwed to the first joint unit (1) by a screw (9) formed inside the first joint unit (1), wherein an O-ring (3), an auxiliary ring (4), a clamping ring (5) and a pressure ring (6) are disposed in order between the first joint unit (1) and the second joint unit (2), and the clamping ring (5) and the pressure ring (6) are formed to be pressingly contacted with or released from an insertion tube (17) by movement of the second joint unit (2) in the axial direction caused by screwing the second joint unit (2), to make sealing and detaching operation of an insertion tube (17) easier.

Therefore, when the insertion tube (17) is inserted into the subject tube joint, the jointing operation is completed by manually rotating the second joint unit (2) a few times with a little force until the second joint unit (2) completely inserted. Also, the inserted tube (17) can be released only by manually rotating the second joint unit (2) a few times to loose the joint. First of all, in order to make insertion easier, a mechanism of the above clamping ring (5) uses a screw, a tapered structure and characteristics of metal a spring.

Although there are many examples of tube joints using screws, it was necessary to strongly fasten a packing member or a metal ring having slits with a large force to seal, fix or simultaneously to seal and fix an insertion tube. In the mechanism of the tube joint according to the present invention the jointing operation can be completed only by force of a screw capable of making rotations by hands.

BRIEF OF THE DESCRIPTION

FIG. 1 is a cross section of an embodiment of the tube joint according to the present invention;

FIG. 2 a cross section of another embodiment of the tube joint according to the present invention;

Figure 4:
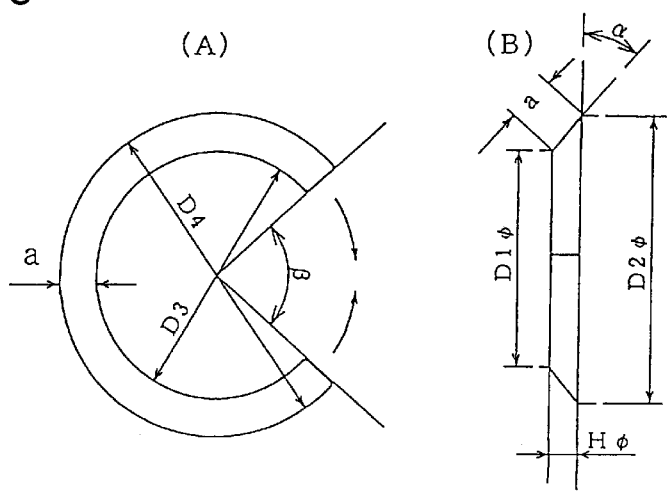
FIG. 4(A) is a plane view showing a preparation of a clamping ring (5)

FIG. 4(B) a side view showing the same;

FIG. 5 is a cross section showing the fist example of a conventional tube joint;

FIG. 6 is a front view showing the same;

FIG. 7 is a cross section showing the second example of a conventional tube joint;

FIG. 8 is a front view showing the same;

FIG. 9 is a cross section of the third example of a conventional tube joint;

FIG. 10 is a perspective view of the same;

FIG. 11 is a cross section of the fourth example of a conventional tube joint; and FIG. 12 is a perspective view of a special clamping ring (39) and a sleeve (41) used in the same;

DETAILED DESCRIPTION OF THE PREFERRED EMBODIMENT

Figure 1:
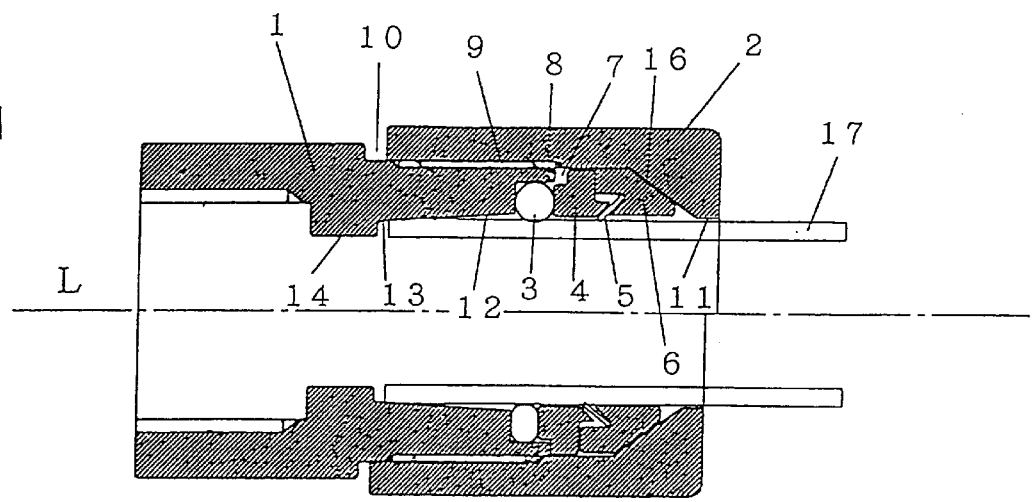
Figure 2:
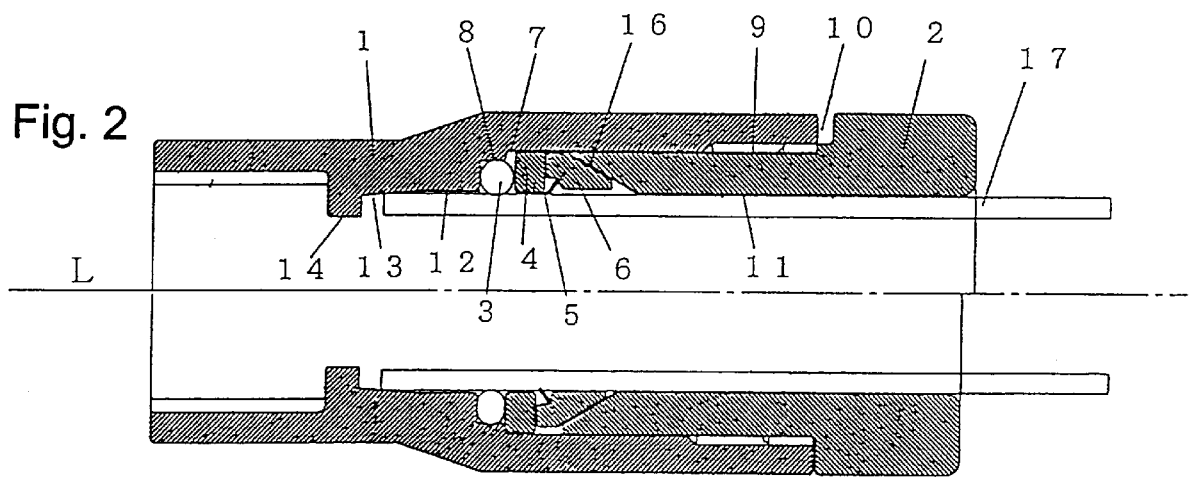

In FIG. 1, the first joint unit (1) and the second joint unit (2) are engaged together by the screw (9) formed inside the first joint unit (1), and the first joint unit (1) is provided with the O-ring (3) and the second joint unit (2) is provided with the auxiliary ring (4), the clamping ring (5) and the pressure ring (6).

In this practical embodiment, all the parts are made of plastic except for the clamping ring (5). Numeral (17) represents a plastic tube inserted into this tube joint, and its outer diameter has a permissible range, e.g. plus or minus 0.15 mm (JIS Standard) in the case of a polybutene tube having the outer diameter of 17 mm. Accordingly, the outer diameter of the tube ranges from 16.85 mm to 17.15 mm, and the inner diameter of the first joint unit (1) should be 17.15 mm plus something, at its maximum value. Taking into consideration that a cross section of the tube may be deformed into an oval shape, the inner diameter (11) is determined at 17.5 mm.

Figure 3:
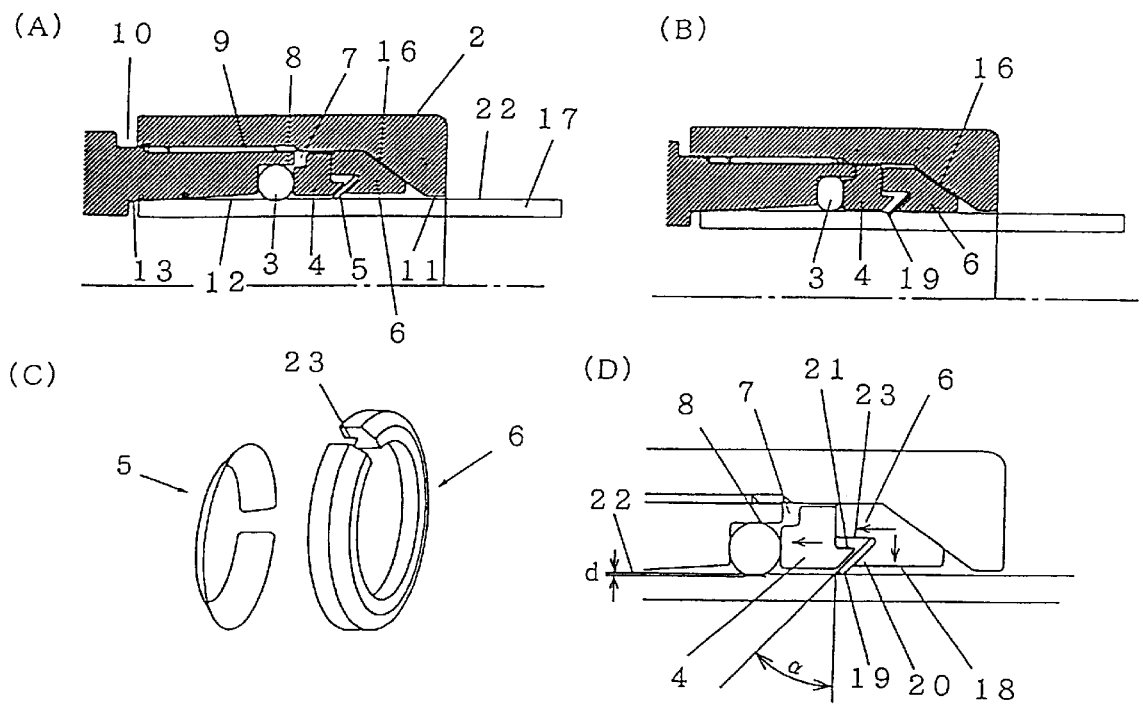
FIG. 3(A) is a detailed cross section of the present invention, which shows the state before second joint unit (2)
FIG. 3(B) is a detailed cross section of the present invention, which shows the state after rotating a second joint unit (2)
FIG. 3(C) is a perspective view of a clamping ring (5) and a pressure ring (6)
FIG. 3(D) is a cross section of connection of a first joint unit (1) and a second joint unit (2)

The details are explained in FIG. 3. The O-ring (3) is contained in a circular groove provided in the inner periphery (8) of the first joint unit (1). The O-ring (3) has an amount of compression defined by the inner diameter of the circular groove containing the O-ring and the axial diameter, of the O-ring (3) inserted into the groove.

The tube joint designed according to the above requirements does not require too much force for insertion. However, a joint in a conventional design can not completely seal the insertion tube due to offset of the tube caused by rolling it and deformation of the cross section of the tube in addition to the above-mentioned permissible range of the diameter. In this practical embodiment, the thickness of the O-ring was selected to be 3.5 mm to determine the diameter of the inner periphery (8) of the first joint unit (1) and the diameter of the O-ring (3) as to obtain a predetermined amount of compression of the O-ring. The amount of compression is shown as the distance (d) in FIG. 3(D).

The space (7) provided between the auxiliary ring (4) and the first joint unit (1) defines the distance up to which the O-ring is additionally compressed. In this embodiment, it is set at 0.6 mm. The clamping ring is a C-shaped ring of a truncated-conical spring material represented by numeral (5) of FIG. 3(C), which is set at the angle (alpha) [shown in FIG. 3(D)]. It is made of a stainless spring material, and has thickness of 0.3 mm.

FIGS. 3(A), 3(B), 3(C) and 3(D) show the mechanism of the clamping ring according to this invention. FIG. 3(A) shows a partial enlarged view of a cross section of the insertion tube (17) on inserting the insertion tube (17). FIG. 3(B) shows the same enlarged view on completing an jointing operation by turning the second joint unit (2). The clamping ring (5) is a C-shaped ring of a truncated-conical spring material having a large inclination angle, as shown in FIG. 3(C), which can reduce its diameter.

Namely, the clamping ring is made of a metal spring material and is prepared by slicing a cone at a predetermined distance from its bottom. As shown in FIG. 3(C), the pressure ring (6) is also made in C-shape, and the diameter of the pressure ring (6) can be reduced if it is made of plastic having a low rigidity property. The pressure ring (6) has a circular groove (23) for holding the clamping ring (5), so that the diameter of the held clamping ring (5) is reduced indirectly.

The inner diameter of the clamping ring (5) is made to be smaller than the inner diameter of the pressure ring (6). Namely, the pressure ring (6) is a C-shaped ring having tapered portion on its periphery, has the inner diameter larger than the inner diameter of the clamping ring (5), further has the circular groove (23) for holding the clamping ring (5), and can reduce the diameter in connection with a tapered portion (16) of the second joint unit (2).

In the status of FIG. 3 (A), namely the insertion tube (17) is just inserted, the inner surface of the clamping ring (5) lightly contacts the insertion tube (17), as the inner diameter of the clamping ring (5) is substantially the same size of an outer diameter (22) of the inserted tube (17). Also, as the inner diameter of the clamping ring (5) is a little smaller than an inner diameter (18) of the pressure ring (6), a tip (19) of the clamping ring (5) is slightly projected from the pressing ring (6), as shown in FIG. 3(D).

Protruding portions (20) and (21) are provided with the pressure ring (6) and the auxiliary ring (4) respectively, so that the protruding portions (20) and (21) can pinch the clamping ring at an angle (alpha). With this setting structure, deformation caused by bending load applied to the clamping ring (5) can be prevented.

In FIG. 3, rotating the second joint unit (2) to move it to the left in the figure, the tapered portion (16) of the second joint unit (2) moves the pressure ring (6) in the direction of reducing the diameter of the pressure ring (6), and the clamping ring (5) also moves in the same direction.

Though the diameter of the pressure ring will not be reduced any more after the pressure ring contacts the outer periphery (22) of the insertion tube (17), the tip (19) of the clamping ring (5) is contacted to the insertion tube (17) with pressure. Simultaneously the pressure ring (6) is moved in the direction of insertion of the insertion tube (17), to move the auxiliary ring in the direction of an arrow as shown in FIG. 3(D). Consequently, the auxiliary ring (4) additionally compresses the O-ring (3) as the same-distance as a space portion (7). Thus, O-ring (3) effectively functions as mentioned below.

When pull-out force is applied to the insertion tube (17) after completion of the jointing operation as shown in FIG. 3(B), a part of the clamping ring (5), which is contacted with, pressure to the insertion tube (17) will become a resistance, and the insertion tube (17) moves the clamping ring (5) and the pressure ring (6) in the direction of pulling out the insertion tube (17). However, because of the tapered portion, the resistance increases as the separation moves in the direction of the diameter reducing to prevent complete detachment of the insertion tube (17).

To intentionally detach the insertion tube (17), the second joint unit (2) is rotated to move it to the right in the figure, and the pressure ring (6) and the clamping ring (5) restore by their elastic force to the sate in FIG. 3(A). Then the insertion tube (17) is easily detached. Namely, it is easy to insert the insertion tube (17) because the clamping ring (5) does not apply any resistance to the insertion tube on its insertion.

Furthermore, the present invention also enables easier insertion and complete sealing in the case that an insertion tube which is deformed into an oval cross section can be used. As shown in FIG. 3(D), the O-ring (3) is disposed in an inner diameter (8) of the first joint unit (1) and then an auxiliary ring (4) is also disposed. Regarding the O-ring (3), its thickness and the inner diameter are designed to complete its sealing function by being compressed by the outer diameter (22) of the insertion tube (17) and the inner diameter of the first joint unit (1), and commonly recommended quantity of compression is sufficient for sealing.

However, as mentioned above, conventional tube joints requires larger compression force for a deformed insertion tube. Moreover, the O-ring (3) is provided in a closed space, and when the O-ring (3) is further compressed despite the whole volume of the O-ring (3) becomes equal to the size of the space, it will be almost impossible to insert the insertion tube anymore. Therefore, in order to prevent such problem, the structure of the invention has a spare space to escape a quantity compressed in the diameter direction of the insertion tube to the direction of the axis of the tube.

Also, an inner diameter of the main unit holding the insertion tube needs to be adjusted to the maximum permissible range of the inserted tube. When a thinner tube is inserted, there will be some play, and when a tube bent by being rolled is inserted, the tube will be strongly offset to one side. With an conventional tube joint, a hard insertion is required to compress the whole periphery of a deformed tube, though there would be still fear of water leakage.

With the tube joint of the invention, an O-ring can sufficiently perform its function without requiring such hard insertion condition. Namely, such causes are eliminated by reforming a deformed insertion tube into a regular circle section.

The improvement of the invention is, as mentioned above, to provide the C-shaped pressure ring (6) having a tapered portion on its periphery, and to enable to reduce the diameter of the pressure ring together with the C-shaped clamping ring (5) by engaging with the tapered portion (16) of the second joint unit (2). Further, the tapered portions (12)(13) which contacts periphery of the tip of the inserted tube (17) are to reduce the inner diameter of in the direction of insertion of the tube (17).

Therefore, the pressure ring (6) can fasten the insertion tube regardless the diameter of the tube and the inevitably reformed into a regular circle to be positioned at the center. Furthermore, when the tip of the tube (17) contacts the inner tapered portion (13) of the tapered portion (12) of the first joint unit (1), the tube (17) is also reformed into a regular circle and is positioned at the center, regardless the diameter of the tube.

The O-ring (5) sufficiently performs its sealing effect with force of the amount of essential compressibility of the O-ring by the above mechanisms performed on the both sides of the O-ring. However, the present invention provides another method of increasing an sealing property of the O-ring besides the above mechanisms.

The method is to press the O-ring by the auxiliary ring (4) according to the movement of the second Joint unit (2), and, further to limit the pressing distance. FIG. 3(D) illustrates the method. The auxiliary ring (4) is movable in the axial direction.

In FIG. 3(D), the O-ring is compressed by the inner diameter (8) of the main unit and the outer periphery (22) of the tube (17), and the O-ring (3) of which the diameter is smaller than the diameter of the outer periphery (22) of the tube (17), is compressed by the distance (d) on insertion of the tube (17).

By the movement of the auxiliary ring (4) in the direction of the arrow, the O-ring (3) is compressed up to the volume of the space (7). Accordingly, the O-ring (3) is compressed enough to tightly contact with the outer surface of the tube (17) for completely sealing the tube (17). The movement of the auxiliary ring (4) is made by pressure though the pressure rise (6) and caused by rotating the second joint unit (2).

If a diameter of the O-ring (3) has a size as to slightly contact with the insertion tube (17), resistance force on insertion is very little, but in this case, a moving distance of the auxiliary ring (4) increases and also number of rotating operation of the second joint unit (2) increases. As previously mentioned, the pressing length of the distance (d) will not provide any large resistance force on insertion.

An object of a simple operation is to reduce number of rotation of the second joint unit (2) as less as possible and to enable to operate with less force, namely operated by a hand without using any tool e.g. a spanner or a wrench.

Regarding the distance of compressing the O-ring (3), in the case that the space (7) has large volume, the second joint unit (2) can be considerably firmly fastened even by hand, but it would be an excessive fastening operation for the purpose of preventing water leakage.

However, this would be an unnecessary operation considering the permanent distortion of the O-ring (3) itself. It requires a force at starting of rotating the second joint unit (2) also to loose it. In order to operate with a small force, it is necessary to provide a limitation in the pressing distance of the O-ring (3).

It is the defined space of the space (7). When a rubber ring such as the O-ring is fastened in a screwing manner, the screwing operation becomes tighter gradually, but when a rigid ring is fastened, the operation suddenly stops at an end point.

An operation with a small force will be enabled by stopping the rotating operation at the point. Thus, in the present invention, a limitation is provided for the distance of an additional pressing operation of the O-ring (3). In the case of FIG. 8 showing the conventional tube joint, use of the sleeve is indispensable, but the subject tube joint of this invention has a feature that it does not require any sleeve.

The clamping ring (39) has structure which supports the tube (17) with points rather than with a line to prevent separation of the tube. Therefore, if the tube does not have a regular circle cross section, only some of the claws work and prevention of separation would be unstable.

The sleeve (41) is used to reform the tube cross section into a regular circle, and is indispensable for the tube joint.

According to the present invention, the pressing ring (6) fastens the tube with its plane portion at the same time as the clamping ring (5) biting into the tube, which also works to reform the tube into a circle, whereby a sufficient resistance for pulling out force can be obtained without a sleeve.

The mechanism of the clamping ring and the pressing ring for fastening the tube works multiplicatively, and if the force to pull out the tube is strong, the resistance force against it will increase accordingly, like an the automatic lock mechanism. Tapered portions (12) and (13) of the first joint unit, which were mentioned above have another effect. In the case that the tapered portions are not provided in the first joint unit, on advancing the second joint unit, it may happen that the clamping ring works first to bite the tube and then the O-ring is pressed.

At this time, the tube (17) has already positioned in the middle portion inside the first joint unit (1) and been contacting a step (14) projecting toward the center axis. If the clamping ring (5) is further pressed while the clamping ring (5) is biting into the outer periphery (22) of the tube (17) the clamping ring (5) will receive a large stress because the tube (17) itself does not move.

To prevent this problem a mechanism in which an inserted tube can slightly move forward shall be provided. A buffer member provided on the step (14) to which the tube (17) contacts will solve the problem.

However, it is not undesirable to use another material in the point of manufacturing cost. A more effective way is the provision of the tapered portions (12) and (13). The inserted tube (17) once stops at a position in the tapered portion where the inner diameter of the pan becomes equal to the outer diameter of the inserted tube (17).

Even if the tube is further pressed at that position by a strong force, the tube can move further because of the tapered structure. A cross section of every plastic tube would be deformed and not be completely a regular circle, such deformation will function as a cushion at the position.

The joint of the invention is provided in the state that the second joint unit (2) is loosened and a gap (10) is made between the first joint unit (1) and the second joint unit (2). In this state the tube (17) can be inserted and reach the tapered portion (13) of the first joint unit (1) without any difficulty.

The tube is easily pulled out at this state, namely attaching and detaching operation is done freely. In order to complete the jointing operation and to make it unable to pull out the tube (17), the second joint unit (2) shall be lightly rotated by hand.

It requires just a few times, and this process completes in a few seconds. When rotation of the second joint unit (2) becomes hard, connection is completed and the clamping ring (5) and the pressure ring (6) firmly hold the inserted tube (17).

Also, they work to reform the cross section shape of the deformed tube (17) into a regular circle in cooperation with the tapered portions (12) and (13) of the first joint unit (1), and to enhance the sealing effect between both sides of the O-ring (3).

The rotating operation is easy regardless the diameter of the tube, and the pressure force increased by the screw applies a necessary and sufficient force to the tube. Rotating the second joint unit (2) one or two times to loose it, the tube can be easily pulled out.

The functions of the joint will last, even if the attaching and detaching operations are repeatedly made, without using a sleeve. When the tube is intentionally pulled out it only needs to rotate the second joint unit (2) a few times in the direction of loosening.

The subject joint has a structure in which both operations of additionally fastening the O-ring (3) and contacting the clamping ring to the tube (17) with pressure, are simultaneously made by a single operation of rotating the second joint unit (2) with the limitation in its movement.

Namely, hardness of the inserting operation in the conventional joint is solved by providing the rotation mechanism, and such mechanism consequently resulted many features as mentioned above. The subject tube joint according to the present invention eliminates the difficulties in insertion and detachment and troublesome use of a sleeve, and can provides reliable joint operations and makes the attaching and detaching operations easier.

The present invention also has superior features in structure, operation and effect, and they will be explained in practical embodiments as described below.

It is almost impossible to make a spring of a steep truncated cone from a flat plate by plastic distortion, which has a shape of a regular circle, not C-shape, because a crack may occur in it. However, in this embodiment it has a C-shape and its preparation is easy. FIG. 4(A) is a development figure of the truncated cone shown in FIG. 4(B).

The process of preparing the ring of FIG. 4(B) is punching out the flat plate first and then bringing end portions of the ring close to each other in the direction of the arrows in FIG. 4(A). The shape shown in FIG. 4(B) can easily be made by elastic distortion merely, it returns to the original shape when the force is not applied. The shape shown in FIG. 4(B) can be stabilized by a little plastic distortion.

If the ring is formed to be slightly opened than the dimensions shown in FIG. 4(B), the ring will be stabilized when it is contained in the pressure ring (6) because of its resiliency. FIG. 4(B) shows the necessary dimensions on forming a clamping ring (5) into a truncated cone shape. Dimensional relations corresponding to the dimensions of the punched out plate shown in FIG. 4(A) can be expressed in simple numerical formulas.

In this embodiment, the width (a) of the plate is 3 mm, the angle (alpha) is 45 degree the height (H) is 2.1 mm, the inner diameter (D1) is 17.00 mm and the outer diameter (D2) is 21.8 mm. In order to prepare this piece, each measurement in FIG. 4(A) is as follows; (beta) is 105 degrees, (D3) is 24.3 mm and (D4) is 30.3 mm. As the diameter is actually further reduced from the shape of FIG. 4(B), and the end portions are to overlap each other, therefore the end portion is cut off up to 2.5 mm previously. As the inner diameter of the clamping ring (5) is 17.0 mm, the clamping ring does not engage the tube (17) at the time of insertion.

The pressure ring (6) has a groove (23), as shown in FIG. 3(C), to which the clamping ring (5) can be mounted, and a part of its circumference is cut off. A tapered portion of 35 degrees is provided on the periphery of the pressure ring to contact with a tapered portion on an inner tip of the second joint unit (2) at the surface (16) to reduce its diameter.

As mentioned above, the groove (23) is provided to contain the clamping ring (5) in the groove. The inner diameter of the pressure ring (6) is made larger than the inner diameter of the clamping ring (5). Projecting amount of the clamping ring is set at 0.4 mm in order to engage the tip of the clamping ring (5) with the tube (17) when the pressure ring (6) reduces its diameter and contacts the tube with pressure. Accordingly, the inner diameter of the pressure (6) is set at 17.8 mm. This projecting amount is determined at the initial setting and it will not change even if the pressure ring reduces its diameter.

If the projecting amount is too small, the clamping ring (5) may be drawn out with scraping the surface of the tube (17) just like a plane when pulling out force is applied. If the projecting amount is too much, it will be difficult to contact the pressure ring (6) to the tube (17) with pressure, and only the resistance force of the clamping ring (5) will hold the tube.

Further explanation with respect to the main unit is as follows. In this embodiment the tapered portions (12) and (13) of the first joint unit (1) have an inclination angle of 5 degrees. This structure functions as a buffer means for the tube (17) and also functions to position the tube (17) at the center against the tapered portion (12) having a so-called backlash and to correct offset and oval shape of the tube. Such effectiveness of the tapered portions would decrease if the angle of the portion is not adequate.

If the angle is large, strong insertion force is required to obtain the above-mentioned functions. If the angle is too small, the distance of the tapered portion should be extended and the inserted tube can not be pulled out due to a wedge effect. In the embodiment of the invention, with the taper angle of 5 degrees, the distance of the tapered portion from the part having the inner diameter of 17.5 mm to the part having the minimum inner diameter of 16.8 mm of the tube (17) is approximately 4.6 mm.

A rotating operation of one pitch of the screw (9) of the first joint unit (1) makes advance motion in the space (7) for O-ring by 0.6 mm and in the clamping ring portion by approximately 0.5 mm though it differs according to the permissible range of the tube. Accordingly, the total distance of the movement is 1.1 mm. Then the second joint unit (2) can be joined or removed by making rotation of approximate time. Although only one rotation is required according to a calculation in theory, with respect to the prototype tube joint actually made according to the above design, one and a half rotations are required for a having a minimum diameter of its permissible range, and one rotation for a tube having a maximum diameter. In either case, jointing and removing operation of the tube is smooth and easily done.

Although in the embodiment, one clamping ring (5) is used, to increase its resistance against the pulling out force, two clamping rings are used. In this case, a spacer having a thickness of 4 to 6 mm is provided between two clamping rings. The cross section of the spacer has a shape of rhombus to fit the inclination angle of the clamping rings, and the spacer is also a C-shaped ring.

The length of the groove (23) of the pressure ring (6) is extended for the two clamping rings and the spacer, and the angle of the tapered portion (16) contacting the second joint unit (2) is set at 20 degrees, in order to enlarge an area to which the pressure ring contacts when the diameter of the pressure ring is reduced, and also to make the rotating operation of the and joint unit (2) easier. The effect of the resistance force against the pulling out force the pulling out force will still be the same, if the two clamping rings are just adjoined and used without the spacer. Thus, with the use of two clamping rings, the resistance force against the pulling out force becomes approximately two times with compared to the use of only one clamping ring.

As mentioned above, there are difficulties in a conventional joint which is to complete a connecting operation only by inserting a plastic tube having a large permissible range. The present invention is intended to solve the problems accompanying with the conventional simple-action tube joints. Even if there is a large permissible range, or the tube is bent and its cross section is deformed into an oval, the present invention will provide a tube joint which has more operability and reliability than the conventional tube joint, by a clamping mechanism using a metal spring and a smooth rotation mechanism.

While the invention has been described in conjunction with one of its preferred embodiments, it should be understood that changes and modifications may be made without departing from the scope and spirit of the appended claims.

What is claimed is:

1. A tube joint comprising a first joint unit and a second joint for sealably connecting a tube thereto, wherein an O-ring, an auxiliary ring, a truncated-conical clamping ring and a pressure ring are operatively positioned between the first joint unit and the second joint unit, the first joint unit and the second joint unit being sealably connectable to each other via a screw portion formed on the first joint unit such that the pressure ring, the clamping ring, the auxiliary ring and the O-ring are positioned relative to one another therebetween to receive at least one of radial and axial pressure and the O-ring is compressed into tight contact with an outer surface of the tube in response to sealed connection between the first and second joint units, the pressure ring is a C-shaped ring having tapered portion of its periphery, has an inner diameter larger than an inner diameter of the clamping ring, has a circular groove for holding the clamping ring, and is capable of engaging with a tapered surface formed on an inner surface of the second joint unit, and at least said first and second joint units are formed of plastic material and said clamping ring is a metal spring material.

2. The tube joint as described in claim 1, wherein the clamping ring is a C-shaped ring of a metal spring material.

3. The tube joint as described in claim 1, wherein the second joint unit has a tapered inner portion at one of its end, of which diameter reduces in the direction of insertion of the insertion tube when said tapered inner portion directly in radial and axial pressure communication with said pressure ring.

4. The tube joint as described in claim 1, wherein the auxiliary ring of the first joint unit presses the O-ring according to the movement of the second joint unit, and a space portion is provided between the first joint unit and the auxiliary ring in order to define pressing distance up to which the O-ring is compressed.

5. The tube joint as described in claim 1, wherein the O-ring is formed with a predetermined thickness such that a first space is provided between the inner periphery of the first joint unit and the outer periphery of the second joint unit a second space is provided between the inner periphery of the second joint unit and the outer periphery of the tube.

6. A tube joint comprising a first joint unit and a second joint unit for sealably connecting a tube thereto, wherein an O-ring, an auxiliary ring, a truncated-conical clamping ring and a pressure ring are operatively positioned between the first joint unit and the second joint unit, the first joint unit and the second joint unit being sealably connectable to each other via a screw portion formed on the first joint unit such that the pressure ring, the clamping ring, the auxiliary ring and the O-ring are positioned relative to one another therebetween to receive at least one of radial and axial pressure and the O-ring is compressed into tight contact with an outer surface of the tube in response to sealed connection between the first and second joint units, and at least said first and second joint units are formed of plastic material and said clamping ring is a metal spring material.

7. The tube joint as described in claim 6, in which the clamping ring is a C-shaped ring of a metal spring material.

8. The joint as described in claim 6, in which the pressure ring is a C-shaped ring having tapered portion of its periphery, has an inner diameter larger than an inner diameter of the clamping ring, has a circular groove for holding the clamping ring, and is capable of engaging with a tapered surface formed on an inner surface of the second joint unit.

9. The tube joint as described in claim 6, in which the second joint unit has a tapered inner portion at one of its end, of which diameter reduces in the direction of insertion of the insertion tube when said tapered inner portion directly in radial and axial pressure communication with said pressure ring.

10. The tube joint as described in claim 6, in which the auxiliary ring of the first joint unit presses the O-ring according to the movement of the second joint unit, and a space portion is provided between the first joint unit and the auxiliary ring in order to define pressing distance up to which the O-ring is compressed.

11. The tube joint as described in claim 6, wherein the O-ring is formed with a predetermined thickness such that a first space is provided between the inner periphery of the first joint unit and the outer periphery of the second joint unit a second space is provided between the inner periphery of the second joint unit and the outer periphery of the tube.

\* \* \* \* \*